3,324,101
OLEFIN POLYMERIZATION PROCESS AND
CATALYST THEREFOR
Leonard M. Baker, Westfield, and Wayne L. Carrick, East Brunswick, N.J., assignors to Union Carbide Corporation, a corporation of New York
No Drawing. Filed May 14, 1965, Ser. No. 455,941
41 Claims. (Cl. 260—94.9)

This application is a continuation-in-part of our earlier application Ser. No. 298,474 filed July 29, 1963 now abandoned which itself was a continuation-in-part of our earlier application Ser. No. 199,650 filed June 4, 1962, entitled, "Olefin Polymerization Process," which is now abandoned.

This invention relates to the polymerization of ethylene alone or with mono unsaturated olefins. More particularly, it is concerned with a new catalytic process for the polymerization of said olefins, and to a silylchromate catalyst system therefor.

It is well known that olefins can be polymerized with complex catalyst compositions consisting of two or more independent components. For example, the so-called Ziegler type catalysts make use of a transition metal compound and a reducing agent, normally a compound of a Group I, II, or III metal. Such catalysts, as is known, require special handling because of the sensitivity of the reducing agents to atmospheric gases and moisture. It is also known that olefin polymers can be produced with certain catalysts supported on inert carriers; for example, the use of supported transition metal oxide catalysts on carriers such as alumina, chromia, silica, and the like. This latter type of catalyst also requires special handling since it is used in the form of an insoluble catalyst slurry.

It has now been found that certain compounds containing both the silicon and chromium elements in the molecule, which we will call silylchromates, can be used to polymerize ethylene to solid polymeric substances. It has also been found that these compounds can be used in conjunction with alkyl aluminum compounds to produce catalyst compositions which allow polymerization of ethylene to occur under milder conditions than is possible in the absence of the alkyl aluminum compound.

The suitable silylchromate compounds are characterized by the presence therein of the group of the formula

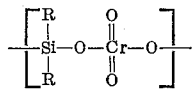

wherein R is a hydrocarbyl group having from 1 to 14 carbon atoms. Among the preferred compounds containing said group are the bis-trihydrocarbylsilylchromates of the formula.

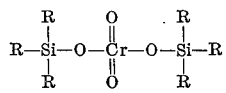

wherein R is as defined above. R can be any hydrocarbon group such as an alkyl, alkaryl, aralkyl or an aryl radical containing from 1 to about 14 carbon atoms, preferably from about 3 to about 10 carbon atoms. Illustrative thereof are methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methylbenzyl, phenyl, tolyl, xylyl, naphthyl, ethylphenyl, methylnaphthyl, dimethylnaphthyl, and the like. Illustrative of the preferred silylchromates but by no means exhaustive or complete of those which can be employed in this process are such compounds as bis-trimethylsilylchromate,
bis-triethylsilylchromate,
bis-tributylsilylchromate,
bis-triisopentylsilylchromate,
bis-tri-2-ethylhexylsilylchromate,
bis-tridecylsilylchromate,
bis-tri(tetradecyl)silylchromate,
bis-tribenzylsilylchromate,
bis-triphenethylsilylchromate,
bis-triphenylsilylchromate,
bis-tritolylsilylchromate,
bis-trixylylsilylchromate,
bis-trinaphthylsilylchromate,
bis-triethylphenylsilylchromate,
bis-trimethylnaphthylsilylchromate,
polydiphenylsilylchromate,
polydiethylsilylchromate, and the like. While both the aryl-and alkyl-substituted silylchromates can be used, it is to be noted that the arylsilylchromates are more preferred. The alkylsilylchromates because of their instability and in some instances because they may be spontaneously explosive, should be handled with extreme caution, and preferably in solution or in an inert atmosphere or both.

The bis-trihydrocarbylsilylchromates also have the advantageous property of being thermally stable when, as indicated above, the hydrocarbyl portion is an aromatic group and in many instances they can be handled in the presence of atmospheric moisture for periods up to several hours. These compounds are well known in the art, but have not heretofore been known as being suitable for the production of olefinic polymers.

In many instances, these silylchromate compounds are soluble in organic hydrocarbon liquids, as for example the bis-triphenylsilylchromate, and thus have the highly desirable advantage for use as a completely soluble olefin polymerization catalyst or initiator. Soluble catalysts such as are now provided, make the homogeneous polymerization of olefins to high polymer possible without the need for catalyst separation or purification of the polymer to separate out catalyst residues. This fact also simplifies the handling of the catalyst during polymerization and the ease with which the residues can be removed from the polymer, if such removal is desired. This invention also makes possible the polymerization of olefins to high polymer to a significantly higher solids content level, thus securing significantly higher polymer/catalyst ratios.

Heretofore, insoluble transition metal oxide catalytic systems, for example, could be employed in organic solution only to a point where the normally solid polymer product represented but a small fraction of the total mass of the reaction system, generally at about 5 to 10 percent polymer solids after which it was necessary to pass the reactor effluent to a gas liquid separator where dissolved monomer is flashed overhead for recycle or reuse. The polymer solution then was passed to a zone wherein more solvent was added to dilute the solution and wash the polymer in order to remove the catalyst.

Now it is possible with these silylchromate catalysts to carry out the polymerization to a solids level of substantially above 25% even up to 75% polymer solids and higher, when sufficient agitation is provided to permit contact of the olefin monomer with the catalyst in the organic solvent. Naturally as the polymer solids in the reaction mass increases, the viscosity of the mass increases. An adequately powered agitator providing high shear conditions to the mass has been found to be highly suitable to provide this catalyst contact with the monomer. High pressures also facilitate this contact, and combinations of pressure and high shear agitation are most satisfactory.

The simplicitiy and efficiency of the process of the present invention contrasts sharply with existing processes. In the process of this invention, only two pounds of solvent need to be used per pound of polymer produced, compared with 15-20 pounds of solvent per pound of polymer produced by other polymerization processes. In this step alone, the solvent handling and refining operation has been reduced to almost one-tenth of the standard load. In addition, significantly fewer steps are required in the overall process, and the high catalyst productivity allows the catalyst residue to be left in the polymer product with either no treatment or with only a simple deactivation treatment.

The silylchromate catalysts are advantageously employed in a finely divided or dispersed phase in the organic solvent reaction medium, or deposited or adsorbed on an insoluble support in the same manner, by the use of a finely divided and insoluble inorganic support material such as silica, alumina, silica-alumina mixtures, thorea, zirconia, and other insoluble metal oxides, sulfates, and like inorganic materials. After polymerization the solid catalysts may be filtered off, modified or otherwise changed if desired to remove them from the polymer or make their presence innocuous and harmless in the polymer.

Preferably, when employed as a solid catalyst or when employed as deposited or adsorbed on a solid insoluble support, there should be large surface area for greatest contact of the catalyst with the monomer. Hence, it is highly advantageous that they be as finely divided as practical and desirable, considering the possibility of later separation by filtration or other catalyst removal steps if desired. Preferably, porous supports having large surface areas for the adsorption and/or deposition of the silylchromates such as in the order of 50 to 1000 square meters or more per gram are employed. This provides for greater ease of contact of the olefin monomer with the catalyst. Particle size of porous supports is not critical in this invention but can provide economic and materials handling benefits, depending upon the recovery techniques employed.

In this embodiment of the invention, it is highly desirable that the inert support be completely dried and freed of moisture and extraneous liquids before being contacted with the silylchromate. This is normally provided by a simple heating or pre-drying of the catalyst support with an inert gas prior to use herein. Surprisingly, however, it has been found that the temperature of drying has an appreciable effect on the productivity of the catalyst system and on the molecular weight distribution and the melt index of the polymer produced.

Drying or activation of the support can be accomplished at nearly any temperature up to about its sintering temperature for a period of time at least sufficient to remove the adsorbed water but avoiding contact which will remove all of the chemically bound water. Desirably, an inert gas stream through the support during the drying aids in the displacement. Temperatures of from about 100° C. to 900° C. for a short period of about two hours or so should be sufficient if a well dried inert gas is used and the temperature not be permitted to get so high as to remove the chemically bound hydroxyl groups on the surface of the support. It is believed that these groups are responsible for the outstanding results secured with these supports since indications are that some interaction takes place between the silylchromate and the bound hydroxyl groups of the silica support so as to firmly anchor the silylchromate on the support.

Any grade of support can be used herein but the microspheroidal intermediate density (MSID) silica is preferred for the higher melt index resins. This grade has a surface area of 258 square meters per gram and a pore diameter of about 288 A., although the intermediate density (ID) silica having the same area but a pore diameter of 164 A. is as satisfactory. Other grades such as the G-968 silica and G-966 silica-alumina, as designated by W. R. Grace and Co., having surface areas of 700 and 500 square meters per gram, respectively and pore diameters of 50-70 A. are also quite satisfactory. Variations in melt index control and in polymer productivity can be expected between different grades of supports.

The inert organic solvent medium when employed in this invention is not critical in this invention but when used, it should be inert to the silylchromate catalyst and olefin polymer produced and be stable at the reaction temperature used. It is not necessary, however, that the inert organic solvent medium serve also as a solvent for the catalyst composition or for the polymer produced. Among the inert organic solvents applicable for such purpose may be mentioned saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like, tetrachloroethylene, and chlorinated aromatic hydrocarbons, such as chlorobenzene, ortho-dichlorobenzene and the like. Particularly preferred solvent media are cyclohexane, pentane, hexane and heptane.

These catalysts are however susceptible to poisons that may affect the rate of polymerization of the olefin to high polymers. Consequently it is desired to maintain the products substantially pure or free of extraneous matter that may be harmful to polymerization. Appreciable amounts of moisture in the reaction medium or which may be introduced in the monomers, catalyst support or similar sources has been found to be deleterious and should be avoided insofar as possible. Substantially anhydrous conditions are preferred in using them for the polymerization of olefins. Maintenance of such conditions is readily within the skill of those in this art in removing substantially all water and moisture from the solvent medium, monomer, catalyst support and like materials employed in the reaction.

When the solvent serves as the principal reaction media, it is of course desirable to maintain the solvent medium substantially anhydrous and free of any possible catalyst poisons, by redistilling or otherwise purifying the solvent before use in this process. Treatment with an adsorbent such as high surface area silicas, aluminas, molecular sieves and like materials are beneficial in removing trace amounts of contaminants that may reduce the polymerization rate or poison the catalyst during reaction.

However, it is also possible to operate the polymerization reaction without an added solvent reaction medium, if desired. For example, the liquid monomer itself can be the reaction media, either with the normally liquid monomers as in making ethylene-propylene copolymers using liquefied propylene and other similar normally liquid monomers or by operating under sufficient pressure that a normally gaseous monomer is liquefied. Or if desired, the silylchromate catalyst can be dissolved or suspended in a liquid media and injected into a gaseous or liquid stream of the olefin monomer, preferably in a high pressure vessel or tubular reactor.

When it is desired to conduct the polymerization to a high solids level as hereinbefore set forth, it is of course desirable that the solvent be liquid at the reaction temperature, and it should not react with any of the reactants or interfere with the reaction in any way whatsoever. For example, the process can be essentially a slurry or suspension polymerization process by operating at a temperature below the solution temperature of the polymer in the solvent in which the polymer actually precipitates out of the solvent reaction medium and in which the silylchromate catalyst is dissolved, or suspended as finely divided mass of itself or on an insoluble support as hereinbefore set forth.

This slurry system is of course dependent upon the particular solvent employed in the polymerization and its solution temperature of the polymer prepared. Consequently, in our "particle form" embodiment, it is most desirable to operate at a temperature less than the normal solution temperature of that polymer in the selected solvent. As for example, polyethylene prepared herein has a solution temperature in cyclohexane of about 90° C. and whereas in pentane its solution temperature is about 110° C. It is characteristic of this "particle form" polymerization system that the high polymer solids content is possible even at low temperatures provided sufficient agitation is present to enable adequate mixing of the monomer with the polymerizing mass. It appears that while the polymerization rate may be slightly slower at the lower temperatures, the monomer is more soluble in the solvent medium thus counteracting any tendency to low rates and/or low yields.

It is also characteristic that the monomer appears to have substantial solubility characteristics even in the solids portion of the slurry so that as long as agitation is provided and polymerization temperature maintained, a broad range of size of solid particles in the slurry can be provided. It has been our experience that the slurry technique can produce better than a fifty percent solids system provided sufficient fluidizating conditions and agitation is maintained. We most particularly prefer to operate the slurry process in the range of 30–40 weight percent of polymer solids.

Recovery of the polymer from the solvent medium is in this embodiment simplified to a simple filtration and drying operation and no efforts need be expended in polymer clean up and catalyst separation or removal. The residual concentration of catalyst in the polymer is so small, generally less than two to three parts of chromium per million parts of polymer that such levels are innocuous and unnoticed in the polymer. Expeditiously, they can be left in the polymer.

When an insoluble inorganic support for the catalyst is employed, we prefer it to be used in amounts from about 1 to 20 times the weight amount of the silylchromate catalyst. Without desiring to be bound by any particular theory, it is believed that the beneficial results of the supported catalyst is principally due to the extremely large surface area of contact available, although other factors may contribute significant benefits. These supports are highly polar and readily adsorb polar molecules so it is likely that these may also act as scavengers to remove catalyst poisons from these systems. We have found that these supports readily adsorb the silylchromate catalyst and thus immobilizes the catalyst on the support to yield high surface area of catalyst sites. This adsorption is so readily effected that the mere presence of the support in the reaction system is sufficient. It is preferred however that the support be substantially free of water before use so as to maintain nearly anhydrous conditions in the polymerization reaction. Heating the support in a dry gas for several hours is generally sufficient, although other methods for drying the support are readily obvious to those skilled in the art.

The polymerization reaction is carried out at temperatures of from about 30° C. or less up to about 200° C. or more, depending to a great extent on the operating pressure, olefin monomer, catalyst and its concentration. The selected operating temperature is dependent upon the desired polymer melt index since temperature is definitely a factor in adjusting the molecular weight of the polymer. Preferably the temperature is from about 30° C. to about 110° C. in the slurry or "particle forming" technique and from 100° C. to 200° C. in "solution forming" techniques. As with most catalytic systems, the higher temperatures produce the lower weight average molecular weight polymers, and consequently higher melt index.

The operating pressure for polymerization can be any pressure sufficient to initiate the polymerization of the monomer to high polymer and can be varied from subatmospheric pressure, using an inert gas as diluent, to superatmospheric pressures up to about 1,000,000 p.s.i.g. or more. Preferably, however, the reaction is carried out at a pressure of from about 3000 p.s.i.g. to about 40,000 p.s.i.g. in the absence of alkyl aluminum cocatalyst. In the presence of the alkyl aluminum compound, when used, the preferred pressure is from atmospheric up to about 300 p.s.i.g. In the presence of a finely divided or large surface area support for the silylchromate which provides large surface contact of the catalyst with the monomer, pressure of 100 to 1000 p.s.i.g. are preferred. However, as can be seen from the above discussion and the appended examples, a wide latitude of pressures can be employed to secure the high polymers of the olefin.

Among the mono unsaturated olefins which can be polymerized with ethylene by this invention are those containing from 2 to 10 carbon atoms. Illustrative thereof one can mention ethylene, propylene, butene-1, pentene-1, 3-methylbutene-1, hexene-1, 4-methylpentene-1, 3-ethylbutene-1, heptene-1, octene-1, decene-1, 4,4-dimethylpentene-1, 4,4-diethylhexene-1, 3,4-dimethylhexene-1, 4-butyl-1-octene, 5-ethyl-1-decene and the like. Ethylene can be polymerized individually to yield homopolymers, or in combination to yield copolymers, terpolymers and the like. Polyethylene is the particularly preferred homopolymer. Preferred copolymers are those containing a major proportion of interpolymerized ethylene, propylene or butene along with a minor proportion of any of the other monomer copolymerizable therewith, including those designated above and conjugated and non-conjugated dienes such as butadiene, dicyclopentadiene, and 1,7-octadiene and the like. The particularly preferred copolymer is ethylene/propylene copolymer.

As the olefin monomers which can be polymerized according to the present process often exist in the gaseous state, it is preferred to effect reaction by bubbling the gas through the catalyst composition either dissolved or suspended in the inert organic solvent medium. Polymerization can also be effected by initially sealing the fixed amount of such monomers in a polymerization reactor with the catalyst material and the inert organic solvent, and allowing the reaction to proceed under autogeneous pressure with, if desired, further batchwise addition of monomer. Continuous polymerization techniques however are preferred. In any event, reactive contact between the olefin to be polymerized and the catalyst composition should be maintained by constantly stiring or agitating the reaction mixture. Care should be taken to exclude moisture and oxygen although a small amount may be desirable as an accelerator. Since these substances are known to often interfere with polymerization, such care is within the techniques well known in the art.

The proportion of catalyst in the reaction system is not a narrowly critical factor in obtaining the principal advantages of the present process particularly in the avoidance of large scale solvent handling and separation of it and catalyst residues from the polymer product. When it is desired, however, to also eliminate any catalyst or catalyst residue removal step, it is desirable to employ minimum catalyst concentrations commensurate with the tolerable residual catalyst residue content in the polymer product and with commercially feasible polymerization rates. In general, where the polymerization reaction is carried out to a polymer solids content of about 25 weight percent, catalyst concentrations of from about 0.01 to about 1.0 percent by weight, based on the weight of inert organic solvent employed, accomplishes an efficient and rapid polymerization reaction and produces a polymer product which does not require catalyst or catalyst residue extraction prior to commercial usage. Preferably, catalyst concentrations of from about 0.06 to about 0.5 percent by weight based on the weight of solvent present are utilized, although greater amounts can obviously be employed.

It should also be understood that the invention herein contemplated, includes the techniques of fluidizing the solid catalyst bed in a gaseous system and contacting it with a gaseous olefin feed thereby eliminating the use of liquid solvents and the attendant problems of solvent separation and catalyst poisons as hereinbefore mentioned.

The alkyl aluminum compounds that can be used as co-additives are the trialkylaluminum compounds, the alkylaluminum halides, and the alkylaluminum hydrides. In these compounds the alkyl group can contain from 1 to about 14 carbon atoms, and the halogen can be chlorine, bromine, fluorine or iodine. Illustrative thereof one can mention trimethylaluminum, triethylaluminum, tributylaluminum, tridecylaluminum, tridodecylaluminum, diethylaluminum chloride, dibutylaluminum chloride, dibutylaluminum bromide, dibutylaluminum iodide, dibutylaluminum fluoride, dihexylaluminum chloride, methylaluminum dichloride, ethylaluminum dibromide, butylaluminum dichloride, pentylaluminum dichloride, and the like, as are well known in the art. They can be generically classed as compounds of the formula $R_yAlX_z$ wherein R is an alkyl group as defined above, X is hydrogen or a halogen and $y$ is an integer from 1 to 3 inclusive and $z$ is an integer from 0 to 2 inclusive, the sum of $y$ and $z$ being 3.

When an alkyl aluminum compound is used, the mole ratio of aluminum to chromium in the silylchromate catalyst system can be varied from about 0.1:1 or less up to about 15:1 or more, with preferred ratios being from about 0.5:1 up to about 5:1. These ratios, however, are not critical.

The concentration of silylchromate in the polymerization reaction can be varied from about 10 to about 25,000 parts per million based on the amount of olefin monomer charged; preferably the concentration is kept below about 500 parts per million. Obviously, the lower the impurity level in the reaction system, the lower the catalyst concentration that can be used. With respect to the catalyst-solvent ratios, this again varies with the catalyst form and the reaction temperatures and pressures selected. Solvents also are well known to constitute one of the most significant and vexing sources of catalyst poisoning. Moreover, in prior proposed solution polymerization processes employing transition metal-containing catalysts, the use of large quantities of solvent, i.e., a solvent-to-polymer ratio of the order of 20:1, was believed necessary. Such large proportions of solvent necessarily greatly increased the catalyst poisoning problem. In the present process, however, the proportion of solvent to polymer can be as low as 1:1 or even less, thereby maintaining very high catalyst productivity and efficiency of the system.

When carrying out solution type polymerizations, the fact that polyemrization rate remains high even at the high viscosities encountered at high solids levels, is unexpected. It is particularly surprising and unexpected that the reaction rate remains high when gaseous monomers such as ethylene and propylene are employed. We have found, however, that high polymerization rates are maintained even when using these gaseous monomers at pressures under 100 p.s.i.g. when the reaction solution is agitated by means of a high velocity, high shear stirrer, particularly one driven at speeds in excess of 2000 r.p.m. and designed to impart considerable shearing action on the solution.

Another particularly important advantage afforded by the present process is that the high solids content polymer solution upon completion of the polymerization reaction is, without any further treatment, suitable for polymer isolation by milling techniques, such as those described in U.S. 2,434,707 to W. A. Marshall. The "Marshall mill" is operated most advantageously when the polymer-solvent mixture being treated is high in polymer content. The use of such an enclosed mill also permits the recycle of all or part of the separated solvent to the polymerization reactor without contact with oxygen or atmospheric water vapor which are destructive of many transition metal-containing catalysts.

Still another advantage of the present process is provided by maintaining the catalyst and the polymer, as formed, in homogeneous solution in the solvent medium. By avoiding the formation of a polymer suspension, the reaction mass behaves surprisingly as a viscous fluid which can be pumped and handled by any of the standard techniques for handling fluids.

Still another advantage of having the polymer soluble in the diluent is that high reaction temperatures can be employed. This is advantageous because the high temperatures reduce the viscosity of the solution, they also cause the polymerization to proceed faster, and allow efficient removal of the heat of reaction because of the large temperature differential between the reactor and the cooling water, and also permit control of the polymer molecular weight since high reaction temperatures generally cause the formation of lower molecular weight polymer. This latter factor is particularly important since many catalysts at temperatures below 90° C. tend to produce polymers that are too high in molecular weight for conventional commercial applications.

However, serving in what appears to be a capacity as a chain transfer agent are small amounts of $\alpha$-olefins such as propylene and butene or hydrogen added along with the olefin monomer to reduce and control the melt index of the polymer. While the presence of the olefin or hydrogen is not necessary or critical in this invention, it does provide another technique for the control of molecular weight of the polymers produced, with the greatest increase in melt index noted with the greater amounts of hydrogen added to the system.

Furthermore, the addition of hydrogen to the system appears to narrow the molecular weight distribution of the polymer which is desirable for some end uses. In most cases adequate control of molecular weight can be controlled with molar ratios of 0.001 to 10 or more moles of hydrogen per mole of ethylene, and preferably from about 0.01 to 1 mole of hydrogen per mole of ethylene.

The separation of polymer from the solvent medium is not limited in this invention to the use of a Marshall mill, although a Marshall mill has been found to be well suited for use herein and is preferred. However, it is also possible to employ precipitation and filtration techniques to recover the polymer, or to concentrate the polymer/solvent mass by flash evaporation or other means of solvent removal followed by high shear milling. A number of other suitable high shear mills are commercially available and, because of the low solvent content of the solution to be treated, other devices such as vented extruders, calendering roll mills, planetary rotor mills such as the one described in U.S. 3,075,747 to W. L. Calvert, Banbury mills, and the like, can also be successfully employed to accomplish isolation of the polymer product. By the term "high shear mill" as used hereinafter is meant a mill comprising parallel rolls having intermeshing threads, and the term "high shear conditions" and "conditions of high shear" mean those conditions achieved on a high shear mill or by adequately powered high speed mixers for viscous materials.

It should be understood that the high solids system can be employed with the catalyst dissolved in the solvent or in solid condition as finely divided particles or deposited or absorbed on a support as hereinbefore set forth, provided that the necessary conditions of agitation, pressure, temperature and the like are maintained so as to provide contact of the monomer with the catalyst, and that the pressure and temperature are such as to initiate the polymerization of that monomer to the polymer.

The homopolymers produced by the process of this invention are high density, highly crystalline products which can be used in all of those well known applications in which polyolefins are employed, for example, in the production of films, fibers, molded articles, extruded articles, coatings, and the like; and these products can then be employed in the known conventional application therefor. The copolymers are generally less crystalline or even amorphous, solid high polymers in some respects resembling rubbers and the like. As with other similarly prepared copolymers, they are significantly lower in density than the homopolymers.

In the following examples, which are not to be construed as limiting the invention in any manner whatsoever, parts are by weight unless otherwise specified.

EXAMPLE 1

Into a previously dried and nitrogen-purged 300 milliliter autoclave equipped with a stirrer, there was charged 100 milliliters of cyclohexane which had been previously dried by purging with prepurified nitrogen. To this was added 5.0 grams of bis-triphenylsilylchromate and the mixture was purged with nitrogen for several minutes before sealing the autoclave. The solution was heated to 130° C. and the reaction vessel was pressure-bled several times to remove residual nitrogen. The autoclave was then charged with ethylene gas to a pressure of 21,000 p.s.i. and was maintained at that temperature for sixteen hours affording 170 grams of linear polyethylene. The polyethylene was purified by solution in hot xylene and filtering the hot solution into an excess of methanol. The polymer had a density of 0.9555 g./cc. and a high load melt index (440 p.s.i.) of 0.8 dgm./min. (ASTM D–1238–57T).

In a similar manner a copolymer of ethylene and propylene is produced by the use of a mixture containing about 5 percent propylene and 95 percent ethylene.

EXAMPLE 2

A dry, nitrogen-purged 300 milliliter autoclave equipped with a stirrer, was charged with 1.0 gram of bis-triphenylsilylchromate contained in 150 milliliters of nitrogen dried cyclohexane. The vessel was heated to 150° C. and pressure-bled several times at that temperature to remove excess nitrogen. Ethylene was charged to a pressure of 20,000 p.s.i. and the temperature, after an initial 10° C. exotherm, was maintained at 150 to 153° C. for six hours affording 55 grams of solid polyethylene. The melt index of this polymer was 0.04 dgm./min. and the density was 0.9503 g./cc.

EXAMPLE 3

A 3000 milliliter dried, nitrogen-purged autoclave equipped with a stirrer was charged with 0.5 gram of bis-triphenylsilylchromate contained in 150 milliliters of cyclohexane which had been previously dried by purging with nitrogen. The vessel was heated to 170° C. and pressure-bled several times to remove excess nitrogen. Ethylene was charged to an initial pressure of 20,000 p.s.i. and the reaction was allowed to proceed for four hours while the temperature within the vessel was maintained at 170 to 175° C. Approximately 20 grams of a solid polyethylene was obtained. Upon drying, this material was found to have a melt index of 4.3 dgm./min.

EXAMPLE 4

A dried autoclave equipped with a stirrer was charged with 150 milliliters of heptane containing 4.0 grams of bis-triphenylsilylchromate. The solvent had been previously dried by purging with nitrogen. After heating to 162° C. and pressure-bleeding several times to remove residual nitrogen, the vessel was charged with ethylene to a pressure of 23,000 p.s.i. and maintained at 162° C. to 165° C. for about sixteen hours. There was produced approximately 50 grams of polyethylene having a melt index of 4.4 dgm./min. and a density of 0.9442 g./cc.

EXAMPLE 5

Bis-triphenylsilylchromate (2.0 grams) contained in 150 milliliters of dried cyclohexane was charged to an autoclave equipped with a stirrer and then heated to 150° C. The vessel was charged with ethylene to a pressure of 5,000 p.s.i. and maintained at 150° C. for twelve hours. The solid polyethylene obtained under these conditions (30 grams) had a melt index of 0.2 dgm./min. and a density of 0.9479 g./cc.

Polyethylene can also be produced by feeding ethylene under a pressure of about 20,000 p.s.i.g. into the inlet valve of a tubular reactor while sumultaneously introducing the catalyst into the reactor and maintaining the temperature at about 175° C.

EXAMPLE 6

Bis-triphenylsilylchromate (2.0 grams) obtained in 1200 milliliters of dried cyclohexane was charged to a stirrer-equipped reactor and heated to 70° C. The vessel was charged with ethylene to a pressure of 30 p.s.i. and triethylaluminum (Al/Cr=4/1) was injected. Polymerization proceeded at constant pressure for one hour affording 20 grams polyethylene having a high load melt index of 0.9 dgm./min.

In another example the ratio of Al/Cr was changed to 0.5/1; 6 grams of solid polyethylene was produced in five minutes and the high load melt index was 0.45 dgm./min.

EXAMPLE 7

Bis-triphenylsilylchromate (0.10 gram) dissolved in 500 milliliters of dried heptane was treated with triethylaluminum in toluene (Al/Cr=6). Passing ethylene through this mixture at 60° C. and one atmosphere pressure afforded 5.1 grams of solid polyethylene having a high load melt index of 1.9 dgm./min.

EXAMPLE 8

Bis-triphenylsilychromate (2.0 grams) dissolved in 2 liters of dried heptane was treated with triethylaluminum in toluene (Al/Cr=6). Ethylene was passed through the mixture and the reaction was allowed to proceed at 80° C. for four hours, after which it was quenched with isopropyl alcohol. The polyethylene was recovered by precipitation with methanol. The catalyst components were removed by extraction with an isopropanol-hydrochloric acid mixture, and the polyethylene was recrystallized from xylene affording a white polymer having a melt index of 0.1 dgm./min. and a high load melt indrx of 11.0 dgm./min.

EXAMPLE 9

Bis-triphenylsilychromate (0.5 gram) dissolved in 750 milliliters of dried heptane was treated with triethylaluminum (Al/Cr.=1.8/1). Ethylene was passed through the mixture at atmospheric pressure and the reaction was allowed to proceed for two hours at 65° C. to 70° C. affording 15 grams of polyethylene having a high load melt index of 1.6 dgm./min.

EXAMPLE 10

Bis-triphenylsilylchromate (0.01 gram) contained in 100 milliliters of heptane was treated with diethylaluminum chloride (Al/Cr=1) at 65° C. Ethylene was passed through the mixture at one atmosphere pressure. After one hour the reaction afforded 1.5 grams of solid polyethylene which, after catalyst extraction with isopropanol-hydrochloric acid mixture and recrystallization from xylene, exhibited a high load melt index of 1.2 dgm./min.

EXAMPLE 11

Polydiphenylsilylchromate (0.1 gram), prepared by the condensation of diphenysilanediol with chromium trioxide, was treated with excess triethylaluminum in 50 milliliters of cyclohexane at room temperature. Passage of ethylene gas at atmospheric pressure through this mixture afforded a white, solid polyethylene.

EXAMPLE 12

Bis-trimethylsilylchromate (0.1 gram), prepared by condensation of hexamethylsiloxane with chromium trioxide, was treated with triethylaluminum in 100 milliliters of cyclohexane at room temperature. Passage of ethylene gas at atmospheric pressure through this mixture afforded a solid polyethylene.

EXAMPLE 13

A high pressure stirred autoclave which had been dried by nitrogen purge was charged with 78 g. of dry cyclohexane containing 5.0 g. of bis-triphenylsilylchromate. After heating the reactor to 130° C., the vessel was bled several times in order to remove residual gases and last traces of moisture. Dry ethylene was then admitted to the autoclave up to a pressure of 21,000 p.s.i.g., and the polymerization was allowed to continue at 130° C. for 16 hours. At the end of this reaction period, the reaction pressure was rapidly released to remove unreacted monomer. The solids content within the polymerization vessel at the time polymerization was stopped was 68 percent by weight. Most of the residual solvent was flash evaporated during the release of pressure. The resulting polymer product was an essentially dry mass of polyethylene containing less than 10 percent solvent. In this form, the polymer can be fed to a vented extruder for substantially complete solvent removal. The yield in this reaction was 170 g. of high density (0.956) polyethylene having a 10P melt index (440 p.s.i.) (ASTM D–1238–57T) of 0.2.

EXAMPLE 14

A solution containing 1.0 g. of a transition metal-containing polyolefin catalyst, bistriphenylsilylchromate, contained in 117 g. of dry cyclohexane, was charged to a dry high pressure polymerization vessel. The mixture was heated to a temperature of 150° C. and pressure bled to remove residual gases as well as last traces of moisture. Dry ethylene was then charged to a pressure of 20,000 p.s.i.g. and the temperature was maintained at 150° C. for 6 hours. The yield was 55 grams of high density polyethylene having a melt index of 0.04. The solids content within the vessel at termination of polymerization was 32 percent by weight.

EXAMPLE 15

A 25 gram sample of a finely divided high surface area silica-alumina (87% $SiO_2$–13% $Al_2O_3$, surface area 500–600 sq. meters per gram) was fluidized at 600° C. for 6 hours in an oxygen atmosphere to effect dehydration.

A one-liter polymerization reactor equipped with a stirrer was then charged with 450 ml. cyclohexane, 0.2 gram of bis-triphenylsilylchromate + 2.0 grams of the anhydrous silica-alumina which had been treated as described above. The reactor was heated to 136° C. and ethylene was added to bring the pressure to 575 p.s.i.g. Polymerization started immediately and the temperature rose to 164° C. in 10 minutes and then slowly declined to 150° C. After a reaction period of one hour, the yield of polyethylene was 95 grams having a melt index of 7.4 and density of about 0.95.

EXAMPLE 16

This experiment was similar to Example 15 except that the catalyst was 0.05 gram of bis-triphenylsilylchromate and 2.0 gram of the anhydrous silica-alumina prepared in Example 16. The yield of polyethylene was 41.5 grams in 3 hours having a melt index of 5.0 a methyl content of 0.3% and a density of 0.95.

EXAMPLE 17

In this experiment 0.1 gram of bis-triphenylsilylchromate and 0.5 gram of the anhydrous silica-alumina support at a reaction pressure of 675 p.s.i.g. and 158° C. produced 30 grams of polyethylene having a melt index of 0.7 and a density of 0.96.

EXAMPLE 18

In this experiment 0.1 grams of bis-triphenylsilylchromate and 0.3 gram of anhydrous silica-alumina was used as catalyst at 158–165° C. and a reaction pressure of 675 p.s.i.g. A yield of 90 grams of polyethylene (Melt Index 0.4) was obtained in 6 hours.

EXAMPLE 19

A sample of high surface area silica, similar to the silica-alumina used in Example 15 was fluidized in a stream of oxygen for 6 hours at 600° C. to effect dehydration. Ethylene was then polymerized as described in Example 16 using 2.0 grams of the anhydrous silica, 0.2 gram bis-triphenylsilylchromate, and 675 p.s.i.g. pressure of ethylene at a reaction temperature of 160–170° C. The yield of polyethylene was 140.6 grams in 5 hours having a melt index of 4.6, a methyl content 0.1% and a density of 0.96.

EXAMPLE 20

A 200 ml. bottle was purged with nitrogen and charged with a magnetic stirring bar, 100 ml. of n-hexane, 4.3 g. of intermediate density silica that had been previously dried at 300° C., and 0.10 g. of bis-triphenylsilylchromate. The bottle was sealed under nitrogen and stirred for one hour at room temperature to effect adsorption of the silylchromate on the silica. At this point 2.5 millimoles of triisobutyl aluminum was added to the slurry to complete the catalyst formation.

A 5-gallon autoclave fitted with mechanical stirrer, cooling coils, ethylene feed line, and catalyst addition port was charged with 6.5 kg. of n-hexane and heated to 85° C. under a nitrogen atmosphere. Propylene was added to increase the pressure by 20 p.s.i.g. and an additional 20 p.s.i.g. of hydrogen was added. The catalyst prepared above was added to the reaction under a nitrogen atmosphere and ethylene was quickly added to bring the pressure to 300 p.s.i.g. Polymerization began immediately and was continued for 3 hours at 87–88° C. Ethylene was fed on demand to maintain 300 p.s.i.g. and cooling was applied to hold the temperature in the specified range. At the end of the 3 hour reaction period the polymer was discharged from the reactor and dried. The yield of copolymer was 4462 grams of white, particulate copolymer; Melt Index=0.10, 10–P Melt Index=17.3.

EXAMPLE 21

In copolymerization of ethylene with other α-olefins the use of different organoaluminum compounds gives different molecular weight polymers. For example, it has been observed that in the copolymerization of ethylene and butene, the use of triisobutyl aluminum gives a higher melt index copolymer than does triethyl aluminum as is seen in the following table using 0.3 mmole of the aluminum compound with 0.1 gram of bistriphenylsilylchromate and a polymerization temperature of 70° C. and an olefin feed stream of 81.7% by weight ethylene and 8.3% by weight butene-1 in the same manner as previously used. Similar or different results can be expected with other aluminum alkyl compounds.

| $R_3Al$ | Yield, gms./hrs. | Melt Index | | [η] | Percent cyclohexane extractibles |
|---|---|---|---|---|---|
| | | 1P | 10P | | |
| $Et_3Al$ | 76/2 | 0 | 2.7 | 7.0 | 4.1 |
| $(Iso\ Bu)_3Al$ | 136/2 | 0.17 | 32.4 | 3.7 | 5.8 |

What is claimed is:

1. A method for the polymerization of ethylene which comprises contacting ethylene with a catalytic quantity of a silylchromate containing the group of the formula

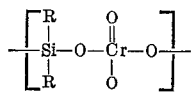

wherein R is a hydrocarbyl radical containing from 1 to about 14 carbon atoms.

2. A method for the polymerization of ethylene which comprises contacting ethylene with a catalytic quantity of a bis-trihydrocarbylsilylchromate having the formula

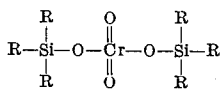

wherein R is a hydrocarbyl radical containing from 1 to about 14 carbon atoms.

3. A method for the polymerization of ethylene which comprises contacting ethylene with a catalytic quantity of a bis-trihydrocarbylsilylchromate of the formula

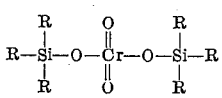

wherein R is a hydrocarbyl radical having from 3 to 10 carbon atoms at a temperature from about 30° C. to 200° C. and at a pressure sufficient to initiate polymerization of the ethylene.

4. The method of claim 3 wherein the ethylene monomer contains a different monounsaturated olefin containing from 2 to 10 carbon atoms.

5. The method as claimed in claim 3 wherein the ethylene monomer is a mixture of ethylene and an olefinically unsaturated monomer copolymerizable therewith.

6. The method as claimed in claim 3 wherein the bis-trihydrocarbylsilylchromate is bis-triphenylsilylchromate.

7. The method of claim 3 wherein the catalyst is bis-triphenylsilylchromate and the only polymerizable monomer present is ethylene.

8. The method of claim 3 where hydrogen is present in an amount from about 0.001 to 10 moles per mole of ethylene.

9. The method of claim 3 wherein the bis-trihydrocarbylsilylchromate is dissolved in an inert organic solvent medium for the polymerization.

10. The method of claim 3 wherein the bis-trihydrocarbylsilylchromate is suspended in finely divided form in an inert organic solvent medium for the polymerization.

11. The method of claim 3 wherein the bis-trihydrocarbylsilylchromate is adsorbed on an insoluble, inorganic material having high surface area.

12. The method of claim 11 wherein the insoluble, inorganic material is a member selected from the group of silica, alumina, thoria, zirconia, and mixtures thereof.

13. The method of claim 12 wherein the inorganic material is a silica having a surface area of 50 to 1000 square meters per gram.

14. The method of claim 3 wherein there is present cocatalytic amounts of an alkyl aluminum compound of the formula $R_yAlX_z$ wherein R is an alkyl group containing from 1 to about 14 carbon atoms, X is a halogen, y is an integer from 1 to 3 inclusive, and z is an integer from 0 to 2 inclusive, the sum of y and z being 3.

15. The method for polymerization of ethylene which comprises contacting ethylene with a catalyst consisting essentially of a chromate containing the group of the formula:

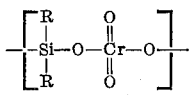

wherein R is a hydrocarbyl radical containing from 1 to about 14 carbon atoms, and an alkyl aluminum compound of the formula $R_yAlX_z$ wherein R is an alkyl group containing from 1 to about 14 carbon atoms, X is a halogen, y is an integer from 1 to 3 inclusive and z is an integer from 0 to 2 inclusive, the sum of y and z being 3.

16. The method for polymerization of ethylene which comprises contacting ethylene with a catalyst consisting essentially of a bis-trihydrocarbylsilylchromate having the formula

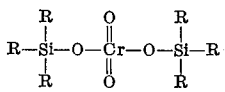

wherein R is a hydrocarbyl radical containing from 1 to about 14 carbon atoms, and an alkyl aluminum compound of the formula $R_yAlX_z$ wherein R is an alkyl group containing from 1 to about 14 carbon atoms, X is a halogen, y is an integer from 1 to 3 inclusive, and z is an integer from 0 to 2 inclusive, the sum of y and z being 3 under conditions sufficient to yield high polymer.

17. The method of claim 16 wherein the bis-trihydrocarbylsilylchromate is adsorbed on an insoluble inorganic material having high surface area.

18. The method of claim 17 wherein the ethylene monomer contains a different monounsaturated olefin containing from 2 to 10 carbon atoms.

19. The method of claim 17 wherein the ethylene monomer is a mixture of ethylene and an olefinically unsaturated monomer copolymerizable therewith.

20. The method of claim 17 wherein the catalyst is a mixture of bis-triphenylsilylchromate and triethylaluminum.

21. The method of claim 17 wherein hydrogen is present in an amount from 0.001 to 10 moles per mole of ethylene.

22. The method for polymerization of ethylene which comprises contacting ethylene with a catalytic quantity of a bis-trihydrocarbylsilylchromate having the formula

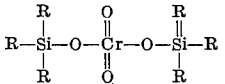

wherein R is a hydrocarbyl radical having from 1 to 14 carbon atoms adsorbed on an insoluble, inorganic material having high surface area, said inorganic material being suspended in an inert organic solvent medium for the polymerization at a temperature between about 30° and 200° C. and at a pressure sufficient to initiate the polymerization of said olefin to normally solid high polymer.

23. The method of claim 22 wherein the insoluble inorganic material is a member selected from the class of silica, alumina, thoria, zirconia, and mixtures thereof.

24. The method of claim 22 wherein the insoluble inorganic material is a silica having a surface area from 50 to 1000 square meters per gram.

25. The method of claim 24 wherein hydrogen is present in an amount from 0.001 to 10 moles per mole of ethylene.

26. A method for the polymerization of ethylene which comprises contacting ethylene with a catalytic quantity of a bis-trihydrocarbylsilylchromate having the formula

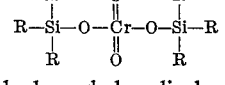

wherein R is a hydrocarbyl radical containing from 1 to about 14 carbon atoms adsorbed on insoluble inorganic material of high surface area and in an inert solvent medium at temperatures between 100° C. to 200° C., at a pressure sufficient to initiate polymerization of the ethylene to normally solid high polymer, and for a time sufficient to produce polymer solids of at least 25 percent of the reaction mass, said solvent medium and said temperature being selected such that at least about 30 percent by weight of the polymer solids are soluble in the solvent at the reaction temperature.

27. The method of claim 26 wherein hydrogen is present in an amount from 0.001 to 10 moles per mole of ethylene.

28. The method of claim 26 wherein there is present an aluminum trialkyl wherein each alkyl group contains from 1 to 14 carbon atoms.

29. A method for the polymerization of ethylene which comprises contacting ethylene with a catalytic quantity of a bis-trihydrocarbylsilylchromate having the formula

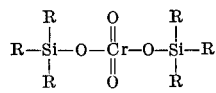

wherein R is a hydrocarbyl radical containing from 1 to about 14 carbon atoms adsorbed on insoluble inorganic material of high surface area and in an inert solvent medium at temperatures between 30° C. to 110° C., at a pressure sufficient to initiate polymerization of the ethylene to normally solid high polymer, and for a time sufficient to produce polymer solids of at least 25 percent of the reaction mass, said solvent medium and said temperature being selected such that the polymer forms an insoluble slurry in the reaction medium.

30. The method of claim 29 wherein hydrogen is present in an amount from 0.001 to 10 moles per mole of ethylene.

31. The method of claim 29 wherein there is present an aluminum trialkyl wherein each alkyl group contains from 1 to 14 carbon atoms.

32. A catalyst system for the polymerization of ethylene comprising a silylchromate containing the group of the formula

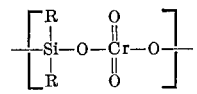

wherein R is a hydrocarbyl radical containing from 1 to about 14 carbon atoms adsorbed on an insoluble, inorganic material having high surface area.

33. A catalyst system for the polymerization of ethylene comprising a bis-trihydrocarbylsilylchromate having the formula

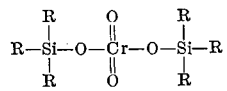

wherein R is a hydrocarbyl radical containing from 1 to about 14 carbon atoms adsorbed on an insoluble, inorganic material having high surface area in an inert organic solvent.

34. A catalyst system of claim 33 wherein the bis-trihydrocarbylsilylchromate catalyst is in an inert organic solvent with an alkyl aluminum compound of the formula $R_yAlX_z$ wherein R is an alkyl group containing 1 to 14 carbons atoms, X is a halogen, $y$ is an integer from 1 to 3 inclusive, and $z$ is an integer from 0 to 2 inclusive, the sum of $y$ and $z$ being 3.

35. A catalyst system of claim 33 wherein the bis-trihydrocarbylsilylchromate is bis-triphenylsilylchromate.

36. A catalyst system for the polymerization of ethylene comprising a silylchromate containing the group of the formula

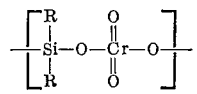

wherein R is a hydrocarbyl radical containing from 1 to about 14 carbons atoms, and cocatalytic amounts of an alkyl aluminum compound of the formula $R_yAlX_z$, wherein R is an alkyl group containing from 1 to 14 carbon atoms, X is a halogen, $y$ is an integer from 1 to 3 inclusive and $z$ is an integer from 0 to 2 inclusive, the sum of $y$ and $z$ being 3.

37. The catalyst system comprising a bis-trihydrocarbylsilylchromate having the formula

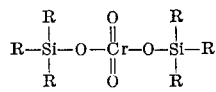

wherein R is a hydrocarbyl radical containing from 1 to about 14 carbon atoms wherein the bis-trihydrocarbylsilylchromate is adsorbed on an insoluble, inorganic material having high surface area.

38. The catalyst system of claim 37 wherein the bis-trihydrocarbylsilylchromate is bis-triphenylsilylchromate.

39. The catalyst system of claim 37 wherein the insoluble, inorganic material is a member of the group of silica, alumina, thoria, zirconia, and mixtures thereof.

40. The catalyst system of claim 39 wherein the bis-trihydrocarbylsilylchromate is bis-triphenylsilylchromate.

41. The catalyst system of claim 40 wherein the insoluble inorganic material is silica having a surface area from 50 to 1000 square meters per gram.

References Cited

UNITED STATES PATENTS

| | | | |
|---|---|---|---|
| 2,863,891 | 12/1958 | Granchelli | 260—429 |
| 2,882,264 | 4/1959 | Barnes | 260—94.9 |
| 2,981,725 | 4/1961 | Loft | 260—93.7 |
| 2,994,711 | 8/1961 | Cohen | 260—448.2 |
| 3,046,267 | 7/1962 | Cohen | 260—94.9 |
| 3,046,268 | 7/1962 | Cohen | 260—94.9 |

JOSEPH L. SCHOFER, *Primary Examiner.*

F. L. DENSON, *Assistant Examiner.*